United States Patent
Joshi et al.

(10) Patent No.: US 7,623,861 B2
(45) Date of Patent: Nov. 24, 2009

(54) METHOD AND APPARATUS TO OPTIMIZE OFF-FREQUENCY PILOT SEARCHING BY WIRELESS MOBILE STATION

(75) Inventors: Abhay Arvind Joshi, San Diego, CA (US); Arthur James Neufeld, Longmont, CO (US); Steven Yoon, San Diego, CA (US); Thunyachate Ekvetchavit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 10/313,750

(22) Filed: Dec. 5, 2002

(65) Prior Publication Data

US 2004/0203838 A1 Oct. 14, 2004

(51) Int. Cl.
*H04W 36/00* (2009.01)
*H04W 72/00* (2009.01)

(52) U.S. Cl. .................. 455/436; 455/437; 455/439; 455/450

(58) Field of Classification Search ......... 455/436–439, 455/450, 443–444
See application file for complete search history.

(56) References Cited

U.S. PATENT DOCUMENTS

| | | | | |
|---|---|---|---|---|
| 5,627,882 A * | 5/1997 | Chien et al. | ............. | 455/574 |
| 5,657,317 A | 8/1997 | Mahany et al. | | |
| 5,870,680 A * | 2/1999 | Guerlin et al. | ............. | 455/557 |
| 5,920,549 A | 7/1999 | Bruckert et al. | ............. | 370/331 |
| 6,069,880 A | 5/2000 | Owen et al. | ............. | 370/311 |
| 6,181,943 B1 * | 1/2001 | Kuo et al. | ............. | 455/437 |
| 6,356,538 B1 * | 3/2002 | Li | ............. | 455/343.1 |
| 6,856,803 B1 * | 2/2005 | Gross et al. | ............. | 455/431 |
| 7,292,551 B2 * | 11/2007 | Lim et al. | ............. | 455/437 |
| 2002/0193116 A1 * | 12/2002 | Agrawal et al. | ............. | 455/445 |
| 2003/0142732 A1 * | 7/2003 | Moshavi et al. | ............. | 375/148 |
| 2004/0229617 A1 * | 11/2004 | Sato | ............. | 455/437 |

FOREIGN PATENT DOCUMENTS

| | | |
|---|---|---|
| EP | 0884918 | 12/1998 |
| EP | 0946076 | 9/1999 |
| EP | 0948231 | 10/1999 |
| WO | 9859448 | 12/1998 |
| WO | WO 0027158 A1 * | 5/2000 |

OTHER PUBLICATIONS

TIA/EIA: "Mobile station-base station compatibility standard for dual mode spread spectrum system." vol. 95B, XP002194318, pp. 61-6574 (1999).
International Search Report—PCT/US03/38802, International Search Authority—European Patent Office—Jun. 2, 2004.

* cited by examiner

*Primary Examiner*—Vincent P Harper
*Assistant Examiner*—Marisol Figueroa
(74) *Attorney, Agent, or Firm*—Kenneth Vu

(57) ABSTRACT

A wireless mobile telephone (400) is operated so as manage the performance of "off-frequency searches," that is, searches for base station pilot signals that differ in frequency from the pilot signals in the mobile station's active set. Whenever frequency searching is performed (such as responsive to emerging from a reduced-power sleep mode), the mobile station performs on-frequency pilot signal searching (902) upon a prescribed active set frequency. Only if a prescribed off-frequency searching condition (903-908) is satisfied, the mobile station additionally performs off-frequency pilot signal searching (912) upon one or more neighboring base stations' frequencies.

33 Claims, 8 Drawing Sheets

METHOD AND APPARATUS TO OPTIMIZE OFF-FREQUENCY PILOT SEARCHING BY WIRELESS MOBILE STATION

BACKGROUND

1. Field

The present invention generally relates to operations performed by a wireless mobile station to preserve communications with a central facility despite movement among coverage areas. More particularly, the invention concerns a wireless subscriber station, and method for its operation, where the mobile station manages the timing and selective performance of "off-frequency searches," that is, searches for base station pilot signals that differ in frequency from the pilot signals of the subscriber station's active set.

2. Background

Mobile phone designers are faced with a variety of different engineering challenges. One of the most perplexing problems is the necessity of using battery power to drive the phone's transceiver, speaker, microphone, display, and all other on-board electronics. A battery can only provide a finite amount of power until exhaustion, at which time the phone ceases to work. Of course, most mobile phone batteries are rechargeable, but this requires access to a power source.

Consequently, mobile phones have been designed with the ability to operate in various low power modes. With the absence of any outgoing or incoming calls, a mobile phone is in an "idle" state. At times, some phone models enter a "sleep" mode where the phone selectively disables various circuitry such as its transceiver, central processor, and certain other hardware. At this point, the phone consumes hardly any current. At periodic intervals that are dictated by the network, the phone briefly awakens, chiefly to receive paging signals from base stations alerting the phone to incoming calls and for other reasons such as searching for pilot signals of nearby base stations, etc. When the mobile phone cannot achieve communications with any base stations for some period of time, the phone enters a "deep sleep" mode, during which the phone waits for user input and meanwhile powers-down to an even greater extent.

Designers of wireless communications systems are continually seeking to further reduce the power consumption of mobile phones. One area of possible focus concerns the periodic wakeup schedule, and more particularly, the search for nearby base stations.

The power consumed during this search is even greater when any nearby base stations utilize pilot signals of a different frequency ("off-frequency") than the base stations that the mobile is presently monitoring (referred to as the mobile's "active set"). In this case, extra power is consumed due to the necessity for the mobile to adjust its transceiver to each off-frequency. Theoretically, the mobile may be programmed to limit its search to on-frequency base station pilot signals, simply omitting the search for any off-frequency base stations. However, this exposes the mobile to the possible danger of losing coverage by unknowingly traveling into the area of an off-frequency base station and then proceeding sufficiently further so as to completely lose coverage from earlier on-frequency base stations without having established communications with the new, off-frequency base station. Then, the mobile could not initiate or receive telephone calls without performing a time and power consumptive reinitialization process. Accordingly, progress remains to be made in the area of periodic wakeup, and particularly, the search for off-frequency base stations.

SUMMARY

A wireless mobile telephone is operated so as to manage the performance of "off-frequency searches," that is, searches for base station pilot signals that differ in frequency from the pilot signals in the mobile station's active set. Whenever pilot signal searching is performed (such as responsive to emerging from a reduced-power sleep mode), the mobile station performs on-frequency pilot signal searching upon a prescribed active set frequency. Only if a prescribed off-frequency searching condition is satisfied, the mobile station additionally performs off-frequency pilot signal searching upon one or more neighboring base stations' frequencies.

DETAILED DESCRIPTION

The nature, objectives, and advantages of the invention will become more apparent to those skilled in the art after considering the following detailed description in connection with the accompanying drawings.

Hardware Components & Interconnections

Introduction

The present disclosure utilizes a wireless communications network with various base stations and mobile stations, among other components. The mobile stations are programmed (in cooperation with the base stations) to preserve communications with the network despite movement among coverage areas. One related activity is the performance of pilot signal searching, that is, the receipt of base station pilot signals to evaluate these base stations for possible use. In addition, the mobile stations conserve battery power by managing the timing and selective performance of "off-frequency searches," that is, searches for base stations pilot signals with frequencies that differ from the pilot signals in the subscriber station's active set.

Further detail is provided below concerning the overall design and operation of this system, as well as its various components.

Wireless Communications System

Figure 1:
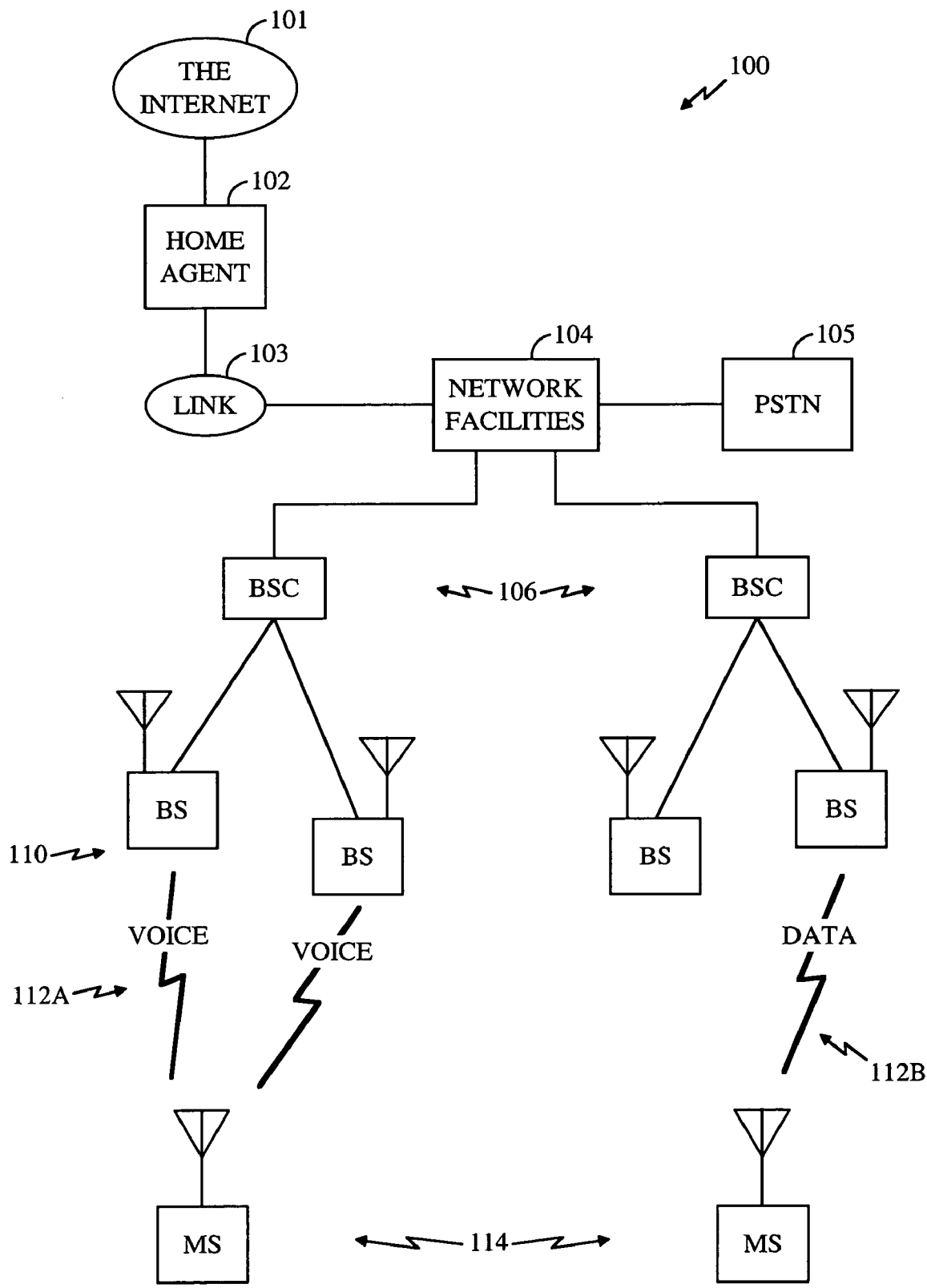
FIG. 1 is a block diagram of some hardware components and interconnections in a wireless communications network.

FIG. 1 illustrates a highly simplified model of an exemplary wireless communications network 100. In one embodiment, the network 100 may be implemented as a high rate packet data or high data rate (HDR) wireless network such as Telecommunications Industry Association (TIA) IS-856 type network. This type of network, for example, is useful for mobile stations to receive e-mail, surf the Internet, and exchange other digital data. Alternatively, or in addition, the network 100 may be implemented as a wireless cellular telephone system according to TIA standard IS-95. The IS-95 standard utilizes code division multiple access (CDMA) modulation techniques to wireless conduct voice calls with greater capacity and more robust performance than earlier wireless telecommunications technologies.

The network 100 includes various mobile stations 114, which comprise CDMA compatible wireless telephones and/or HDR subscriber stations (also called "access terminals"). Mobile stations 114 are served by various base stations 110, which exchange voice and/or packet data content with the mobile stations 114. In the wireless voice telephone context, telephone calls and other voice communications are conducted by exchanging data between mobile stations 114 and base stations 110 via radio frequency (RF) electromagnetic signal channels such as 112a. Base stations may also exchange other types of information with the mobile stations 114, such as call paging messages, origination messages, registration messages, pilot signal reports, and other digital data. In the HDR context, HDR communications are conducted by exchanging internet protocol (IP) packet data between mobile stations 114 and base stations 110 for relay to the Internet 101 or some other packet data network (not shown) such as a corporate network. Examples of packet data include IP datagrams used for such applications as accessing web pages and retrieving e-mail. Such packet data applications may run directly on the mobile stations 114, or may run on a separate computer device that uses the mobile station 114 as a wireless modem. In the HDR context, IP packet data is conducted between mobile stations 114 and base stations 110 via RF electromagnetic signal channels such as 112b.

Some or all of the base stations 110 may be implemented using hardware such as that used by conventional base stations in commercial use today. Each base station 110 is coupled to a base station controller (BSC) 106, each of which conducts two-way information flow between base stations 110 and various network facilities 104 (described below). The BSCs 106 perform various functions that allow mobile communication to take place, including orchestrating the handoff of mobile stations 114 between base stations. If used to implement data interchange in a system such as an IS-856 capable HDR network, the BSCs may include a packet control function (PCF) module to exchange IP data packets with the base stations 110. Each BSC 106 may be implemented using hardware such as that used by conventional wireless networks in commercial use today, for example.

As mentioned above, the BSCs 106 conduct information between the base stations 110 and the network facilities 104. For use in processing voice calls and other IS-95 data, the network facilities 104 may include components such as a mobile switching center (MSC), mobile telephone switching office (MTSO), etc. A MSC component, for example, relays voice stream information between the BSCs 106 and the public switched telephone network (PSTN) 105. An MSC also operates to provide mobility control, call processing, and call routing functionality. As an example, a data services interworking function (IWF) may be used to connect the network facilities 104 to the PSTN 105.

For use in processing HDR information (such as an IS-856 type system), the network facilities 104 may include components such as one or more foreign agents. In this context, the network facilities 104 exchange IP data between the BSCs 106 and one or more home agents 102 via one or more links 103, such as wireless or wire-line T1 or T3 links, fiber optic connections, Ethernet, or other Internet Protocol (IP) connections. The home agent 102, in turn, is coupled to the Internet 101.

Exemplary Digital Data Processing Apparatus

Data processing entities such as components 102, 104, 106, 110, 114 (FIG. 1), or any one or more of their subcomponents may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as non-volatile storage 208. The fast-access storage 206 may comprise random access memory ("RAM"), and may be used to store the programming instructions executed by the processor 202. The non-volatile storage 208 may comprise, for example, battery backup RAM, electrically erasable programmable read-only memory (EEPROM), flash programmable read-only memory (PROM), one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, one embodiment of the invention uses logic circuitry instead of computer-executed instructions to implement various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing (DSP) chip, discrete circuitry (such as resistors, capacitors, diodes, inductors, and transistors), field programmable gate array (FPGA), programmable logic array (PLA), programmable logic device (PLD), and the like.

Wireless Telephone

Figure 4:
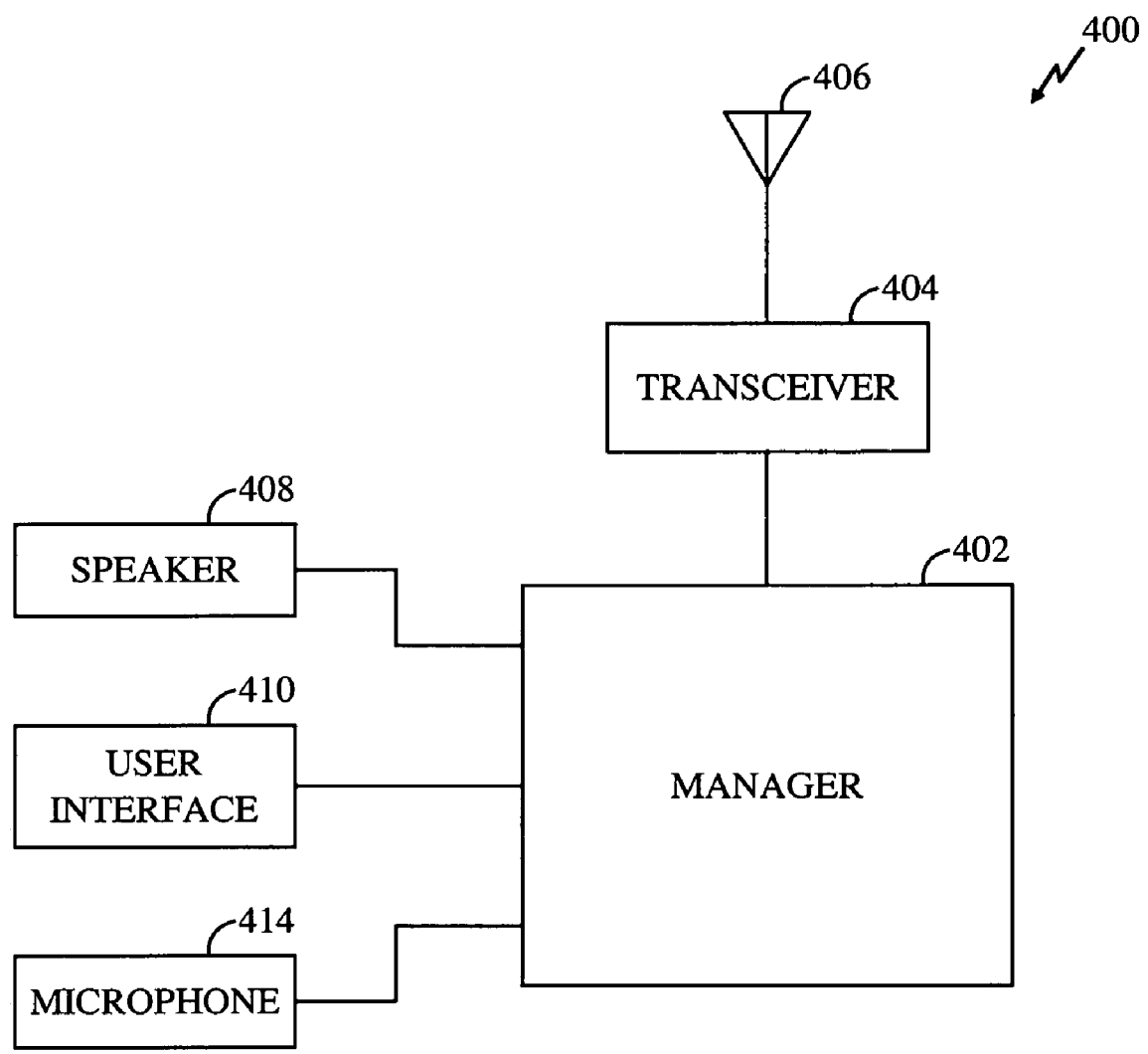
FIG. 4 is a block diagram of the hardware components and interconnections of a wireless mobile station.

FIG. 4 further illustrates the construction of one example of a mobile station as a wireless telephone 400. The telephone 400 includes a speaker 408, user interface 410, microphone 414, transceiver 404, antenna 406, manager 402, along with any other conventional circuitry that may vary depending upon the application. The manager 402, which may comprise circuitry such as that discussed in conjunction with FIG. 2 (above), serves to manage operation of the components 404, 408, 410, and 414 as well as signal routing between these components.

Although the wireless telephone 400 is illustrated, a mobile station may be mobile or stationary. Furthermore, a mobile station may comprise any data device that communicates through a wireless channel or through a wired channel, for example using fiber optic or coaxial cables. In addition to (or instead of) wireless and wireline phones, a mobile station may be configured to implement various other devices including but not limited to PC card, compact flash, external or internal modem, etc.

OPERATION

Having described various structural features, some operational aspects of the present disclosure are now described. As mentioned above, one operational aspect of the present disclosure involves mobile stations conserving battery power by managing the timing and selective performance of off-frequency searches.

Signal-Bearing Media

Figure 2:
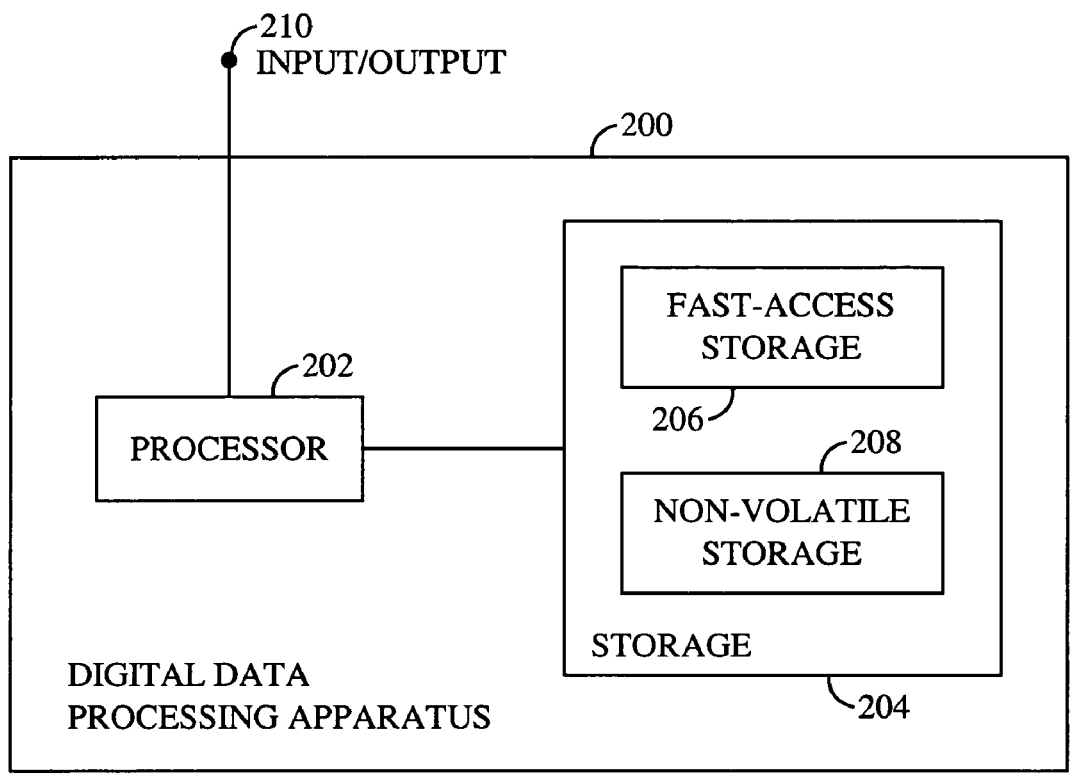
FIG. 2 is a block diagram of an exemplary digital data processing machine.
Figure 3:
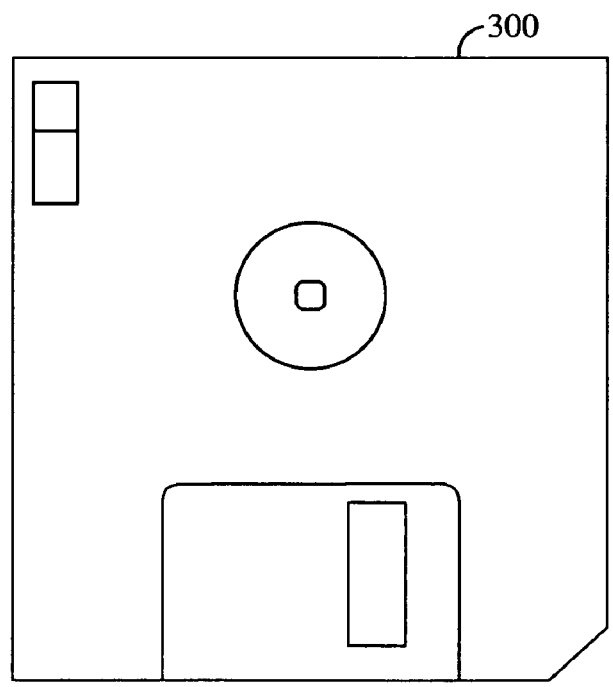
FIG. 3 is a plan view of an exemplary signal-bearing medium.

Wherever any functionality of the present disclosure is implemented using one or more machine-executed program sequences, such sequences may be embodied in various forms of signal-bearing media. In the context of FIG. 2, such a signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media. In an illustrative embodiment of the invention, the machine-readable instructions may comprise software object code, compiled from a language such as assembly language, C, etc.

Logic Circuitry

In contrast to the signal-bearing medium discussed above, some or all of the present disclosure's functionality may be implemented using logic circuitry, instead of using a processor to execute instructions. Such logic circuitry is therefore configured to perform operations to carry out the method aspect of the invention. The logic circuitry may be implemented using many different types of circuitry, as discussed above.

Introduction to Operational Details

As mentioned above, one operational aspect of the present disclosure involves the mobile stations conserving battery power by managing the timing and selective performance of off-frequency searches.

Mobile Stations—Call Model

Figure 5:
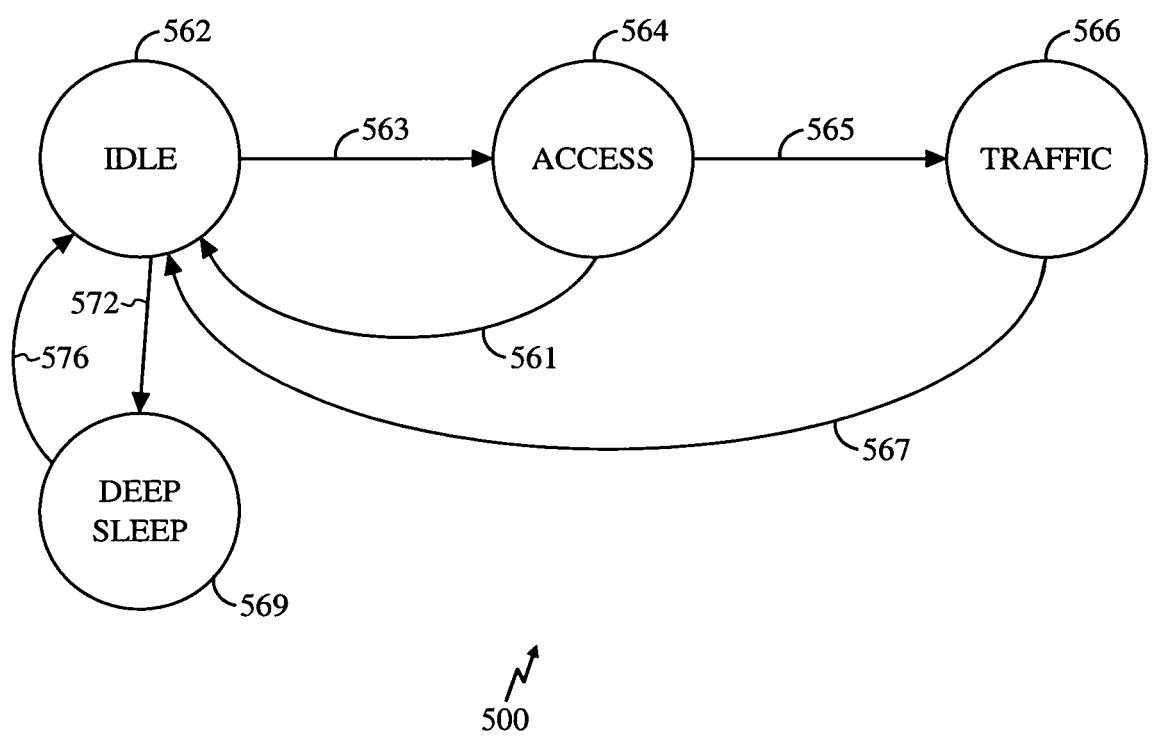
FIG. 5 is a state diagram illustrating the operational states of a mobile station.

Each mobile station 114 operates according to the state diagram 500 of FIG. 5. In the IDLE state 562, the mobile station alternates between wakeup and sleep cycles. In the wakeup cycle, the mobile station performs various functions including monitoring a shared paging channel and a shared overhead channel. These channels are shared in the sense that numerous base stations broadcast paging and overhead information on these channels to all mobile stations in range. Briefly, the shared paging channel advises mobile stations of incoming calls and the shared overhead channel supplies various system related information. In IDLE mode 562, the mobile station monitors messages from one or more of the base stations in its "active set," described in greater detail below. In the IDLE state 562, the mobile station's transmitter is turned off.

In IDLE, the mobile station selectively disables various circuitry such as its transceiver, central processor, and certain other hardware. At this point, the mobile station hardly consumes any current. At periodic intervals that are dictated by the network prior to entering IDLE mode 562, and while still in the IDLE mode 562, the mobile station briefly awakens to receive paging signals from such base stations alerting the phone to an incoming call, to search for pilot signals of possibly nearby base stations, and other purposes. As an example, the periodic wakeup interval may be five seconds.

In one case, the mobile station may exit IDLE 562 to ACCESS 564 along transition 563 when the mobile senses a need to send one or more prescribed messages to the network 100. The mobile only ever transmits to one base station (the mobile's "primary" base station). As an example, in the ACCESS state 564, the mobile may send a registration message, advising the primary base station of the mobile's presence; in this case, the ACCESS state 564 transitions 561 back to IDLE 562 after transmitting the registration message. In another case, the mobile station enters ACCESS 564 whenever the mobile station determines, during its periodic awakening from sleep, that the network is paging the mobile station to connect an incoming call. In this case, after the mobile station answers the page on a common "access" channel, the mobile station receives assignment of a traffic channel on which to conduct the point-to-point call. In another situation, transition 563 from IDLE 562 to ACCESS 564 occurs when the operator uses the mobile to initiate a point-to-point call. The mobile station initiates an outgoing call by sending an appropriate message on the primary base station's access channel, and then receiving channel assignment in the same manner.

Transition 565 from ACCESS 564 to TRAFFIC 566 occurs when the incoming or outgoing call goes through, and the mobile station and primary base station begin to communicate on the traffic channel. In the TRAFFIC state 566, the mobile station utilizes an individual traffic channel to conduct point-to-point communications with another party. The newly initiated point-to-point call may conduct voice and/or HDR data or other information as appropriate.

Transition 567 from the TRAFFIC 566 back to IDLE 562 occurs when the point-to-point call is terminated by either party or when the connection is otherwise broken. Transition 567 includes release of the traffic channel used to conduct the point-to-point call.

Under other circumstances, the mobile station transitions 572 from IDLE 562 to DEEP SLEEP 569 whenever the mobile station has no coverage, that is, it cannot achieve communications with any base station for some period of time. In this state 569, the mobile waits for user input and meanwhile extends its sleep time. In DEEP SLEEP 569, the phone may awaken (as in IDLE) less often, or alternatively discontinue awakenings completely. In DEEP SLEEP 569 the phone may optionally power-down even more of its circuitry (compared to IDLE mode) to further conserve power. Exiting via transition 576 from DEEP SLEEP 569 to IDLE 562 may be achieved responsive to operator instructions, for example, entered via the mobile station's user interface. For instance, the operator may press a prescribed key to exit DEEP SLEEP 569 and return via transition 576 to IDLE 562.

Active Set, Candidate Set, Non-Candidate Neighbor Set

Figure 6:
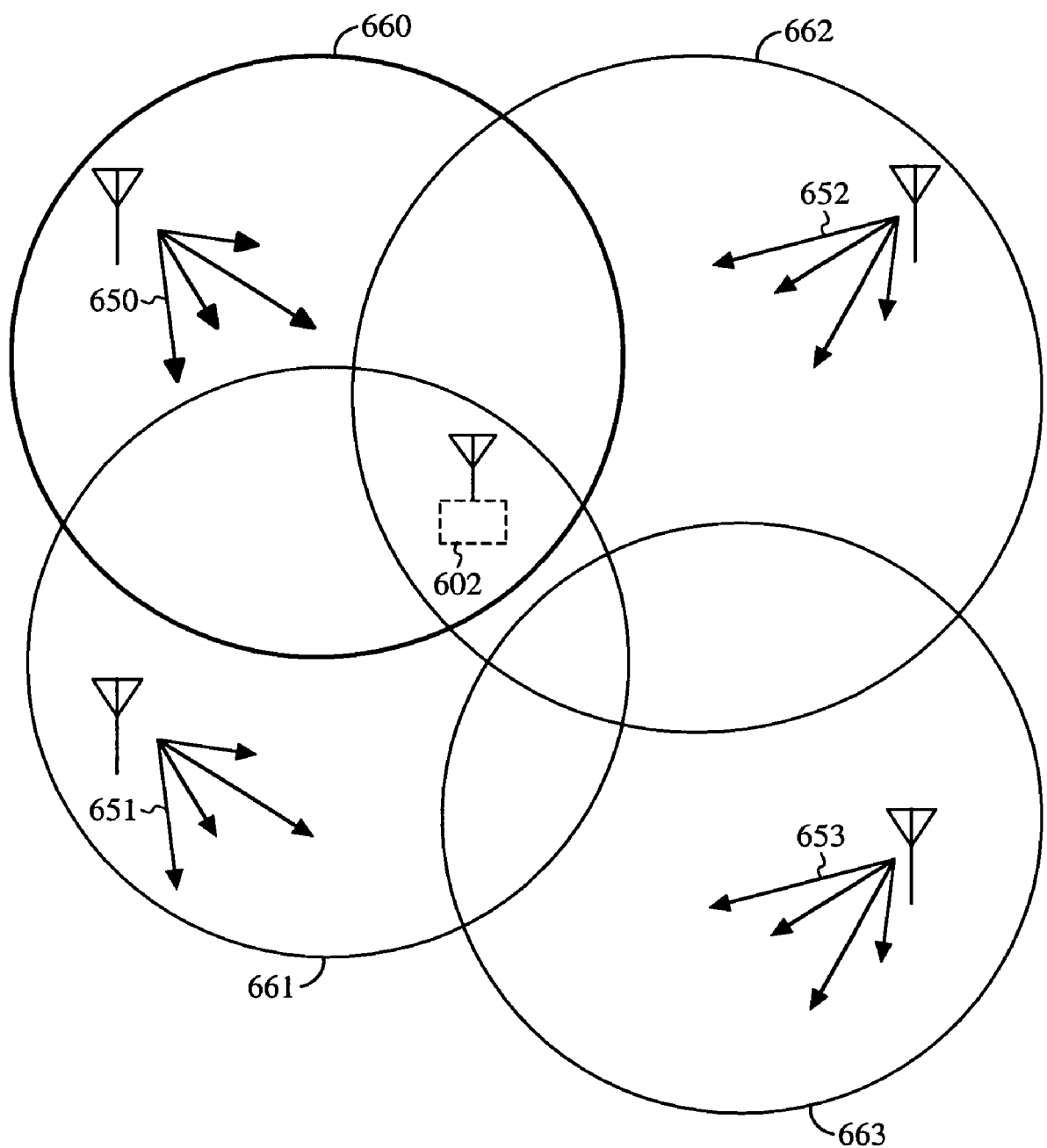
FIG. 6 is a diagram illustrating the relationship between a mobile station and various nearby base stations.

FIG. 6 shows a mobile station 602 in relation to several nearby base stations 650-653 to help illustrate the use of active, candidate, and non-candidate neighbor sets. The base stations 650-653 have respective transmission ranges 660-663. As illustrated, the mobile station 602 is situated within the transmission range of the base stations 650-652, and can therefore receive signals from each of these base stations. The mobile 602 is outside the transmission range of the base station 653.

Figure 7:
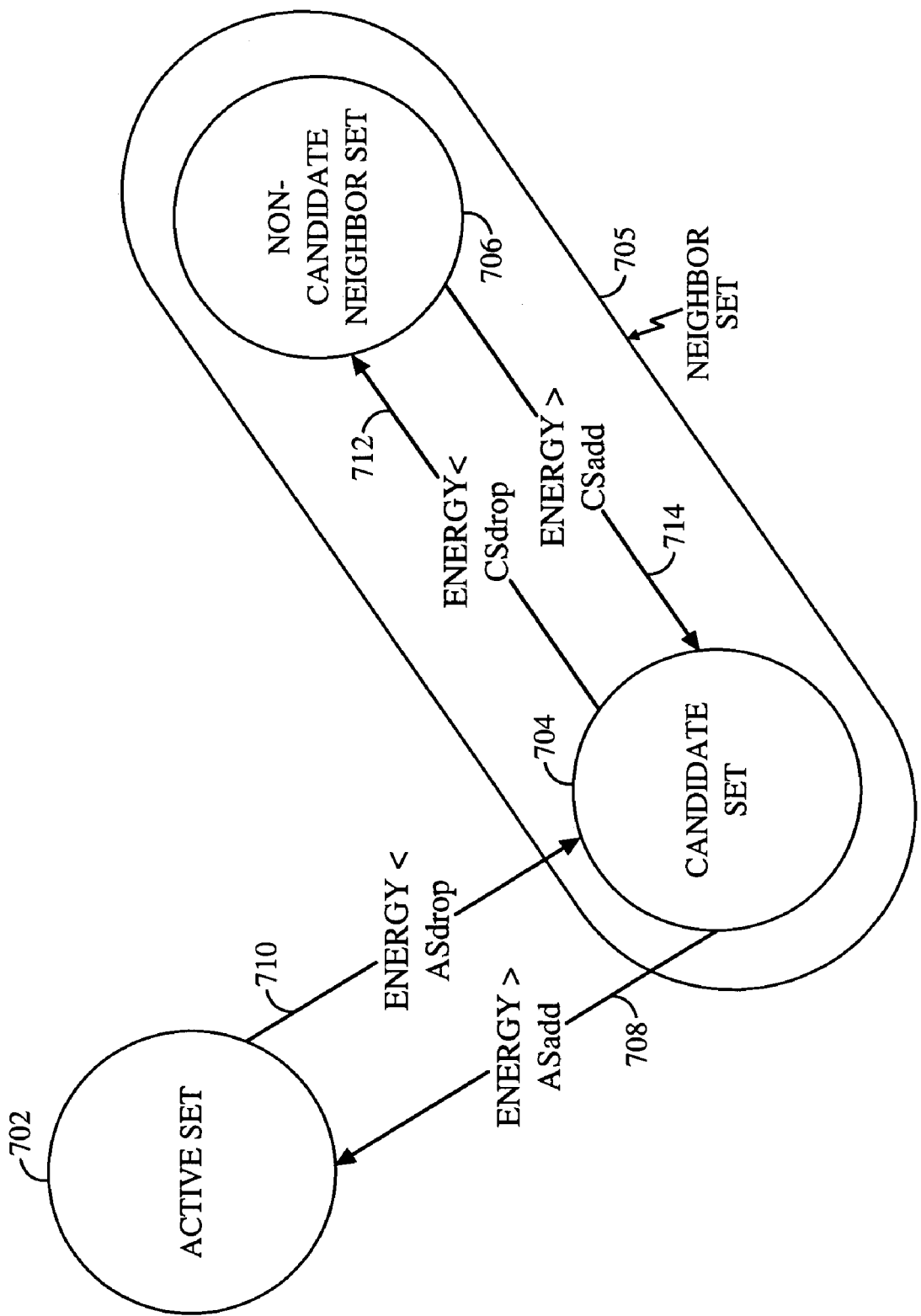
FIG. 7 is a block diagram illustrating the relationship between active set, candidate set, and non-candidate neighbor set.

Referring additionally to FIG. 7, the mobile station 602 at any time defines an active set 702, a candidate set 704, and a non-candidate neighbor set 706. The active set 702 contains at least one base station. The candidate and non-candidate neighbor sets 704, 706 comprise neighboring base stations to the mobile, with the criteria for "neighboring" being determined by the network. In a simple sense, neighboring base stations are nearby the mobile. More particularly, the extent of the neighbor set 705 is determined by network facilities 104, which consult base station layouts and other mapping information to determine which base stations are physically nearby (according to prescribed criteria), regardless of whether the mobile 602 can receive those base stations' pilot signals. Each of the sets 704, 706 includes zero or more specifically identified base stations. Members of the candidate set 704 are those base stations in stronger communication with the mobile, as compared to the non-candidate neighbor set 706. Membership of the active, candidate, and non-candidate neighbor sets are determined by information including pilot signals broadcasted by each base station in the network 100.

The active set 702 of mobile station 602 includes the base stations with the strongest pilot signals, as detected by the mobile 602. In the illustrated example, the active set includes the base station 650. All base stations in the active set 702 necessarily utilize the same frequency pilot signal. Code division multiplexing is utilized to prevent one base station from interfering with others. The mobile station monitors overhead signals (such as paging signals) from one or more members of the active set. The primary base station is one of the active set 702. The mobile directs its outgoing network transmissions (such as registration messages, origination messages, HDR transmissions, and the like) to the primary base station. In contrast, under the IS-95/IS-2000 architecture, the mobile directs voice traffic to many base stations.

The mobile 602 places neighbor base stations of the neighbor set 705 in the candidate set 704 if their measured pilot signal exceeds a given strength, but either fails to reach the minimum strength for the active set or does not utilize the same pilot signal frequency as the active set members. In the example of FIG. 6, the candidate set 704 includes the base stations 651-652. The extent of the non-candidate neighbor set 706 includes the neighbor set 705 base stations that do not qualify for membership in the candidate set 704. An example of the non-candidate neighbor set 706 is the base stations 653.

In summary, especially strong base stations of the non-candidate neighbor set 706 (as sensed by a given mobile) graduate to the candidate set; further, the mobile promotes the strongest base stations of the candidate set to the active set.

The mobile station 602 determines membership of the active set and candidate set during "on-frequency" and "off-frequency" search processes. During voice calls, the off-frequency search process is necessarily conducted fairly often, in order to maintain an accurately selected active set and avoid dropping the call. The off-frequency search necessarily, albeit briefly, interrupts the voice call. As for HDR connections, the mobile station limits off-frequency searches to its periodic awakenings from the IDLE mode 562. Therefore, the mobile station does not perform off-frequency searching during an HDR connection. Although the risk of dropping an HDR call is therefore greater, the consequences are less significant because the unavoidable server, networking, and Internet downloading delays that make dropped HDR calls less noticeable.

"On-frequency" searches comprise pilot signal searches conducted on the same frequency as the pilot signals of the active set base stations. Pilot signal searches conducted on different frequencies than this are called "off-frequency."

After on-frequency and off-frequency searching, the mobile station may promote or demote a given base station among the sets 702, 704, 706. A base station is demoted 710 from the active set 702 when the mobile station's frequency search reveals that the base station's pilot signal falls below a prescribed energy ($AS_{drop}$). Demotion 710 may require permission of the primary base station if the mobile is engaged in the TRAFFIC state. A base station is promoted 708 from the mobile's candidate set 704 to its active set 702 when the mobile station finds that this base station's pilot signal energy exceeds a predetermined energy ($AS_{add}$). Promotion 708 may require permission of the primary base station if the mobile station is engaged in the TRAFFIC state. Similarly, a base station is demoted 712 from the mobile station's candidate set 704 to its non-candidate neighbor set 706 when the mobile station finds that the energy of this base station's pilot signal falls below a prescribed threshold energy ($CS_{drop}$). A base station is promoted 714 from the mobile station's non-candidate neighbor set 706 to its candidate set 704 when the mobile station finds that the energy of this base station's pilot signal exceeds a predetermined threshold ($CS_{add}$).

Promotions and demotions may be further conditioned upon crossing the threshold for a predetermined length of time. The thresholds may vary depending on factors such as the number of pilots already in the set, or the average or minimum energy of the pilots in the set, etc.

Operational Details

Figure 9:
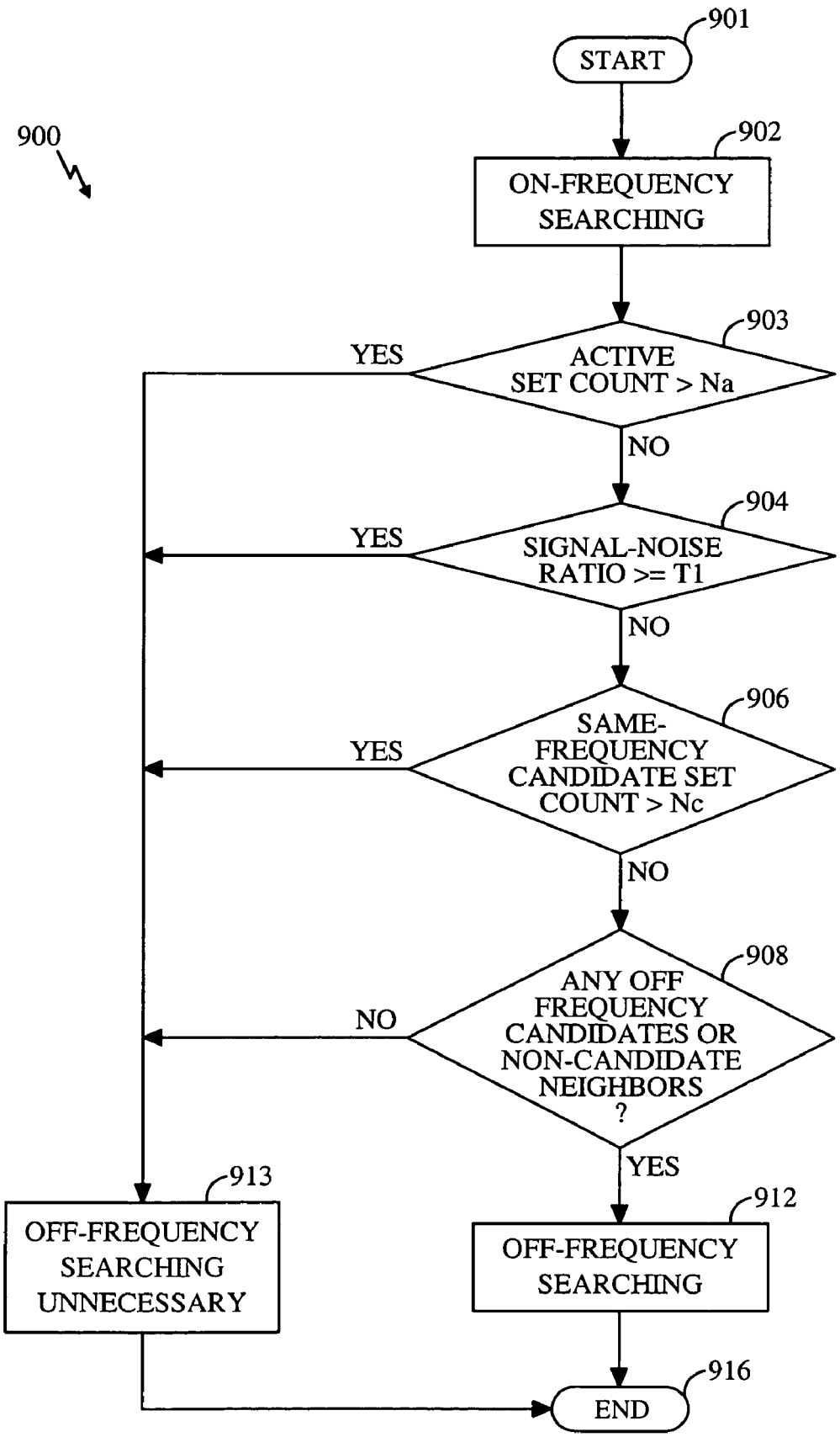
FIG. 9 is a flowchart illustrating frequency searching operations performed by a mobile station.

FIG. 9 depicts one exemplary HDR wakeup sequence 900 for a mobile station. By analogy, similar principles may be used to regulate IDLE mode frequency searching for IS-95 or other types of voice communications. Without any intended limitation, the sequence 900 is discussed in the context of the hardware components and interconnections of the previously discussed figures. The sequence 900 begins in step 901. As one example, this may occur when the mobile station initiates a wakeup process during the IDLE mode. As an example, this may occur periodically on a schedule dictated by the mobile's primary base station. Additionally, during IS-95 or other voice communications, the entire sequence 900 may be performed during ongoing traffic calls to maintain call integrity and assist with handoffs. For ease of explanation, the following example is described in the context of HDR communications, where these steps 900 are only performed during IDLE mode, and in particular, during the wakeup cycle.

In step 901, the mobile station is triggered to start the wakeup process 900. This triggering may occur by a hardware interrupt, expiration of a timer, or another such event. After step 901, the mobile performs on-frequency searching in step 902. Here, pilot signal searching is limited to the active set frequency utilized by base stations of the mobile's active set.

Next, steps 903-908 determine whether a pre-established off-frequency searching condition is met. Off-frequency pilot searching is useful because it allows the mobile station to dynamically handoff to a stronger cell at a different frequency without going through a complete system loss and reacquisition procedure. However, the mobile station might never move to an off-frequency cell, but just stay near; this makes off-frequency searching unnecessary in some conditions. The mobile's standby time can be maximized by avoiding off-frequency searching when the chances of requiring an off-frequency handoff are low. As shown below, conditions including pilot environment on the current frequency can be used to indicate whether or not the mobile station might need a handoff to an off-frequency pilot.

As mentioned above, the off-frequency searching condition is evaluated in steps 903-908. If steps 903-908 find that the off-frequency searching condition is met, off-frequency searching is conducted in step 912. Otherwise, off-frequency searching is deemed unnecessary 913. More specifically, in step 903, the mobile station asks whether a count of base stations in the active set 702 exceeds a prescribed number ($N_a$), for example, the number "one." If there is a sufficient number of active set base stations, then off-frequency searching is not as critical as with an underpopulated active set. Therefore, if step 903 answers "yes," off-frequency searching is unnecessary (913).

Even if step 903 finds off-frequency searching to be warranted, it still may be avoided if there is at least one sufficiently strong signal from the active set base stations. Therefore, step 904 asks whether the maximum signal-to-noise ratio of pilot signals from active set base stations meets a prescribed level ($T_1$), such as −5 dB. If the answer is "yes," indicating a sufficiently high signal-to-noise ratio, then off-frequency searching is unnecessary (913).

Even if steps 903 and 904 find off-frequency searching to be warranted, it still may be avoided if there are a sufficient number of candidate base stations utilizing the active set frequency. Therefore, step 906 asks whether a count of candidate set base stations that utilize the active set frequency exceeds a prescribed threshold ($N_c$), such as zero. If the answer is "yes," indicating a sufficient number of on-frequency candidate set members, then off-frequency searching is unnecessary (913).

Even if steps 902, 904, 906 find off-frequency searching to be warranted, it should be avoided if the candidate and non-candidate neighbor sets do not include any off-frequency members. Therefore, step 908 asks whether there are any off-frequency candidates or non-candidate neighbors. If the answer is "no, then off-frequency searching is unnecessary (913).

If the off-frequency searching is found to be unnecessary (step 913), avoidance of off-frequency searching saves considerable power and time because the mobile station is not required to re-tune its transceiver to any off-frequencies. After step 913, the mobile resumes its sleep cycle in step 916.

Otherwise, if the operations 903-908 find off-frequency searching to be necessary, then off-frequency searching is conducted in step 912. In step 912, the mobile conducts frequency searches for one or more off-frequency pilot signals of neighboring base stations. The knowledge of how many and which off-frequencies to search along with other details of the off-frequency search process will be apparent to ordinarily skilled artisans having the benefit of this disclosure. After step 912, the mobile resumes sleep in step 916, concluding the sequence 900.

One benefit of performing on-frequency searching (902) before off-frequency searching (912) is that it ensures that the most recent search results are used in the off-frequency search decision 903-908. Additionally, power is conserved when the off-frequency searching is done at the end (or beginning) of the wakeup cycle, rather than interspersing off-frequency searches with on-frequency searches.

Figure 8:
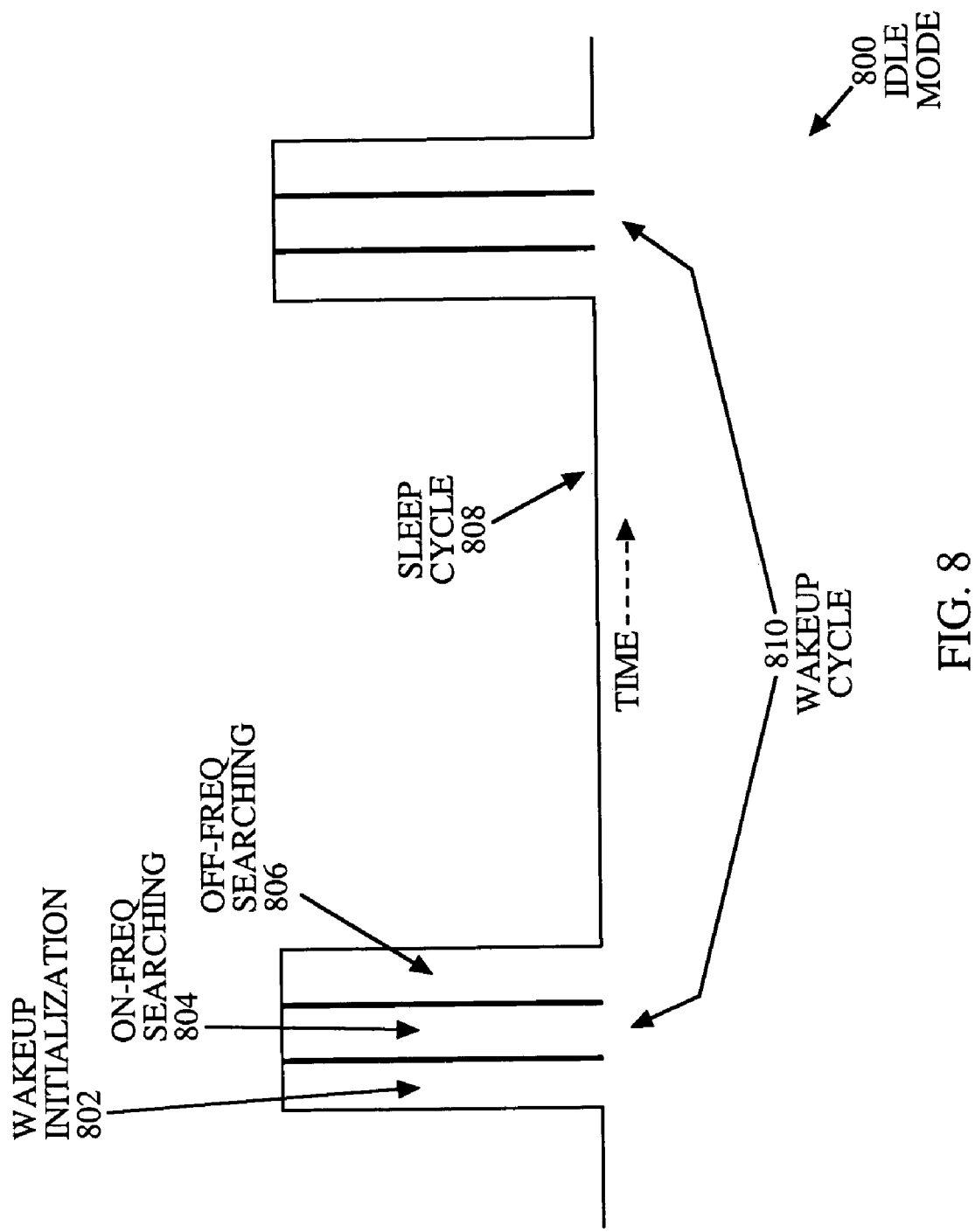
FIG. 8 is a timeline showing IDLE mode events including the relationship between wakeup cycle and sleep cycle, as well as some subcomponents of the wakeup cycle.

This is illustrated in greater detail in conjunction with FIG. 8, which illustrates idle mode 800 operations including the wakeup cycle 810 and the intervening (reduced power) sleep cycle 808. The wakeup cycle 810 includes various initialization functions 802, on-frequency searching 804, and off-frequency searching 806. During initialization 802, the mobile performs startup functions such as boot-up, diagnostics, and the like. During on-frequency searching, the mobile tunes its transceiver to the active set frequency to receive overhead pages and other network information, and for pilot signal strength analysis. During off-frequency searching 806, the mobile searches one or more for pilot signals of nearby base stations utilizing off-frequencies.

One option, as illustrated in FIG. 8, is to consolidate all off-frequency searching, and delay the off-frequency searching until after all on-frequency searching is finished. Thus, off-frequency searching is performed immediately prior to resuming the sleep cycle 808. This conserves power and shortens the time of the wakeup cycle. Otherwise, by interspersing one or more off-frequency searches among the single-frequency on-frequency searches 804, the mobile would have to re-adjust its transceiver (called "RF tuning") more often than necessary, thereby consuming additional power and time. By consolidating off-frequency tuning at the end of the wakeup cycle (as illustrated), the mobile's transceiver can shut down for sleep 808 rather than undergoing time/power consuming RF tuning back to the active set frequency for further on-frequency searches. The same benefits may be realized by consolidating off-frequency tuning for performance at the beginning of the wakeup cycle 810, after wakeup initialization 802. In other words, the order of 804, 806 may be switched.

OTHER EMBODIMENTS

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. The word "exemplary" is used herein to mean "serving as an example, instance, or illustration." Any embodiment described herein as "exemplary" is not necessarily to be construed as preferred or advantageous over other embodiments.

What is claimed is:

1. A method for operating a wireless mobile station, comprising:
    operating in an idle mode including wakeup cycles and sleep cycles, wherein each of the wakeup cycles includes an on-frequency searching time period and an off-frequency searching time period, wherein the wireless mobile telephone has a first power requirement during the wakeup cycles and has a second power requirement less than the first power requirement during the sleep cycles, wherein the wireless mobile telephone is adapted to enable a receiving function during the wakeup cycles and to disable the receiving function during the sleep cycles, and wherein the wireless mobile telephone is adapted to disable a transmitting function during the idle mode and to enable the transmitting function when not in the idle mode;
    transitioning from a sleep cycle in the idle mode to a wakeup cycle in the idle mode;
    determining whether an off-frequency searching condition is satisfied during the wakeup cycle, the off-frequency searching condition being satisfied when a maximum signal-to-noise ratio for one or more base stations in an active set of the wireless mobile telephone is less than a prescribed level and there are no on-frequency base stations included in a candidate set of the wireless mobile telephone;
    performing off-frequency pilot signal searching during the off-frequency searching time period in the wakeup cycle upon at least one other frequency for at least one neighboring base station not in the active set for the wireless mobile telephone when the off-frequency searching condition is satisfied;
    performing on-frequency pilot signal searching during the on-frequency searching time period in the wakeup cycle upon at least one frequency for at least one base station in the active set for the wireless mobile telephone when the off-frequency searching condition is satisfied or not satisfied, wherein the performing the on-frequency pilot signal searching occurs before or after the performing of the off-frequency pilot signal searching when the off-frequency searching condition is satisfied; and
    transitioning from the wakeup cycle to the sleep cycle if additional communication is not required.

2. The method of claim 1, where:
    the off-frequency pilot signal searching is performed after all on-frequency pilot signal searching has concluded to avoid retuning back to the at least one frequency for the at least one base station in the active set.

3. The method of claim 1, where:
    the on-frequency pilot signal searching is completed before commencing any off-frequency pilot signal searching.

4. A method for operating a wireless mobile communications device, comprising:
    operating in an idle mode including wakeup cycles and sleep cycles, wherein each of the wakeup cycles includes an on-frequency searching time period and an off-frequency searching time period, wherein the wireless mobile communications device has a first power requirement during the wakeup cycles and has a second power requirement less than the first power requirement during the sleep cycles, wherein the wireless mobile communications device is adapted to enable a receiving function during the wakeup cycles and to disable the receiving function during the sleep cycles, and wherein the wireless mobile communications device is adapted to disable a transmitting function during the idle mode and to enable the transmitting function when not in the idle mode;
    transitioning from a sleep cycle in the idle mode to a wakeup cycle in the idle mode;
    determining whether an off-frequency searching condition is satisfied during the wakeup cycle, the off-frequency searching condition being satisfied when a maximum signal-to-noise ratio for one or more base stations in an active set of the wireless mobile communications device is less than a prescribed level and there are no on-frequency base stations included in a candidate set of the wireless mobile communications device;
    performing off-frequency pilot signal searching during the off-frequency searching time period in the wakeup cycle upon at least one other frequency for at least one neighboring base station not in the active set for the wireless mobile communications device when the off-frequency searching condition is satisfied;
    performing on-frequency pilot signal searching during the on-frequency searching time period in the wakeup cycle upon at least one frequency for at least one base station in the active set for the wireless mobile communications device when the off-frequency searching condition is satisfied or not satisfied; and
    transitioning from the wakeup cycle to the sleep cycle if additional communication is not required.

5. The method of claim 4, further comprising:
    performing off-frequency pilot signal searching during the off-frequency searching time period in the wakeup cycle upon the at least one other frequency for the at least one neighboring base station not in the active set for the wireless mobile communications device when the off-frequency searching condition is satisfied, wherein the performing the on-frequency pilot signal searching occurs before or after the performing of the off-frequency pilot signal searching when the off-frequency searching condition is satisfied.

6. The method of claim 4, where the determining whether the off-frequency searching condition is satisfied comprises determining whether a count of base stations in the active set is less than a prescribed number.

7. The method of claim 4, where the determining whether the off-frequency searching condition is satisfied comprises determining whether a count of base stations included in a candidate set of the device and utilizing the at least one frequency does not exceed a prescribed number.

8. The method of claim 4, where the determining whether the off-frequency searching condition is satisfied comprises determining whether candidate and non-candidate neighbor sets of the device collectively include at least a prescribed number of base stations utilizing frequencies different than the at least one frequency.

9. The method of claim 4, where the determining whether an off-frequency searching condition is satisfied comprises determining whether:
a count of base stations in the active set is less than a prescribed number;
a maximum signal-to-noise ratio for the at least one base station in the active set is less than a prescribed level;
a count of base stations included in a candidate set of the device and utilizing the at least one frequency is not exceeding a prescribed number; or
candidate and non-candidate neighbor sets of the device collectively include at least a prescribed number of base stations utilizing frequency different than the at least one frequency.

10. A computer-readable medium embodying computer-executable instructions to perform a method, comprising:
operating in an idle mode including wakeup cycles and sleep cycles, wherein each of the wakeup cycles includes an on-frequency searching time period and an off-frequency searching time period, wherein the wireless mobile telephone has a first power requirement during the wakeup cycles and has a second power requirement less than the first power requirement during the sleep cycles, wherein the wireless mobile telephone is adapted to enable a receiving function during the wakeup cycles and to disable the receiving function during the sleep cycles, and wherein the wireless mobile telephone is adapted to disable a transmitting function during the idle mode and to enable the transmitting function when not in the idle mode;
transitioning from a sleep cycle in the idle mode to a wakeup cycle in the idle mode;
determining whether an off-frequency searching condition is satisfied during the wakeup cycle, the off-frequency searching condition being satisfied when a maximum signal-to-noise ratio for one or more base stations in an active set of the wireless mobile telephone is less than a prescribed level and there are no on-frequency base stations included in a candidate set of the wireless mobile telephone;
performing off-frequency pilot signal searching during the off-frequency searching time period in the wakeup cycle upon at least one other frequency for at least one neighboring base station not in the active set for the wireless mobile telephone when the off-frequency searching condition is satisfied;
performing on-frequency pilot signal searching during the on-frequency searching time period in the wakeup cycle upon at least one frequency for at least one base station in the active set for the wireless mobile telephone when the off-frequency searching condition is satisfied or not satisfied, wherein the performing the on-frequency pilot signal searching occurs before or after the performing of the off-frequency pilot signal searching when the off-frequency searching condition is satisfied; and
transitioning from the wakeup cycle to the sleep cycle if additional communication is not required.

11. The medium of claim 10, wherein off-frequency pilot signal searching is performed after all on-frequency pilot signal searching has concluded to avoid retuning back to the at least one frequency for the at least one base station in the active set.

12. The medium of claim 10, wherein the operation of on-frequency pilot signal searching is completed before commencing any off-frequency pilot signal searching.

13. A computer-readable medium embodying computer-executable instructions to perform a method, comprising:
operating in an idle mode including wakeup cycles and sleep cycles, wherein each of the wakeup cycles includes an on-frequency searching time period and an off-frequency searching time period, wherein the wireless communications device has a first power requirement during the wakeup cycles and has a second power requirement less than the first power requirement during the sleep cycles, wherein the wireless communications device is adapted to enable a receiving function during the wakeup cycles and to disable the receiving function during the sleep cycles, and wherein the wireless communications device is adapted to disable a transmitting function during the idle mode and to enable the transmitting function when not in the idle mode;
transitioning from a sleep cycle in the idle mode to a wakeup cycle in the idle mode;
determining whether an off-frequency searching condition is satisfied during the wakeup cycle, the off-frequency searching condition being satisfied when a maximum signal-to-noise ratio for one or more base stations in an active set of the wireless mobile communications device is less than a prescribed level and there are no on-frequency base stations included in a candidate set of the wireless mobile communications device;
performing off-frequency pilot signal searching during the off-frequency searching time period in the wakeup cycle upon at least one other frequency for at least one neighboring base station not in the active set for the wireless communications device when the off-frequency searching condition is satisfied;
performing on-frequency pilot signal searching during the on-frequency searching time period in the wakeup cycle upon at least one frequency for at least one base station in the active set for the wireless communications device when the off-frequency searching condition is satisfied or not satisfied; and
transitioning from the wakeup cycle to the sleep cycle if additional communication is not required.

14. The medium of claim 13, further adapted for:
performing off-frequency pilot signal searching during the off-frequency searching time period in the wakeup cycle upon the at least one other frequency for the at least one neighboring base station not in the active set for the wireless communications device when the off-frequency searching condition is satisfied, wherein the performing the on-frequency pilot signal searching occurs before or after the performing of the off-frequency pilot signal searching when the off-frequency searching condition is satisfied.

15. The medium of claim 13, wherein the determining whether the off-frequency searching condition is satisfied comprises determining whether a count of base stations in the active set is less than a prescribed number.

16. The medium of claim 13, wherein the determining whether the off-frequency searching condition is satisfied comprises determining whether a count of base stations included in a candidate set of the device and utilizing the at least one frequency does not exceed a prescribed number.

17. The medium of claim 13, wherein the determining whether the off-frequency searching condition is satisfied comprises determining whether candidate and non-candidate neighbor sets of the device collectively include at least a prescribed number of base stations utilizing frequency different than the at least one frequency.

18. The medium of claim 13, wherein the determining whether an off-frequency searching condition is satisfied comprises determining whether
 a count of base stations in the active set is less than a prescribed number;
 a maximum signal-to-noise ratio for the at least one base station in the active set is less than a prescribed level;
 a count of base stations included in a candidate set of the device and utilizing the at least one frequency is not exceeding a prescribed number; or
 candidate and non-candidate neighbor sets of the device collectively include at least a prescribed number of base stations utilizing frequency different than the at least one frequency.

19. Circuitry including multiple interconnected electrically conductive elements configured to perform operations to manage a wireless mobile telephone, the operations comprising:
 operating in an idle mode including wakeup cycles and sleep cycles, wherein each of the wakeup cycles includes an on-frequency searching time period and an off-frequency searching time period, wherein the wireless mobile telephone has a first power requirement during the wakeup cycles and has a second power requirement less than the first power requirement during the sleep cycles, wherein the wireless mobile telephone is adapted to enable a receiving function during the wakeup cycles and to disable the receiving function during the sleep cycles, and wherein the wireless mobile telephone is adapted to disable a transmitting function during the idle mode and to enable the transmitting function when not in the idle mode;
 transitioning from a sleep cycle in the idle mode to a wakeup cycle in the idle mode;
 determining whether a predetermined off-frequency searching condition is satisfied during the wakeup cycle, the off-frequency searching condition being satisfied when a maximum signal-to-noise ratio for one or more base stations in an active set of the wireless mobile communications device is less than a prescribed level and there are no on-frequency base stations included in a candidate set of the wireless mobile communications device;
 performing off-frequency pilot signal searching during the off-frequency searching time period in the wakeup cycle upon at least one other frequency for at least one neighboring base station not in the active set for the wireless mobile telephone when the off-frequency searching condition is satisfied; and
 performing on-frequency pilot signal searching during the on-frequency searching time period in the wakeup cycle upon at least one frequency for at least one base station in the active set for the wireless mobile telephone when the off-frequency searching condition is satisfied or not satisfied, wherein the performing the on-frequency pilot signal searching occurs before or after the performing of the off-frequency pilot signal searching when the off-frequency searching condition is satisfied; and
 transitioning from the wakeup cycle to the sleep cycle if additional communication is not required.

20. The circuitry of claim 19, where:
 the operation of off-frequency pilot signal searching is performed after all on-frequency pilot signal searching has concluded to avoid retuning back to the at least one frequency for the at least one base station in the active set.

21. The circuitry of claim 19, where:
 the operation of off-frequency pilot signal searching is completed before commencing any on-frequency pilot signal searching.

22. Circuitry including multiple interconnected electrically conductive elements configured to perform operations to operate a wireless communications device, the operations comprising:
 operating in an idle mode including wakeup cycles and sleep cycles, wherein each of the wakeup cycles includes an on-frequency searching time period and an off-frequency searching time period, wherein the wireless communications device has a first power requirement during the wakeup cycles and has a second power requirement less than the first power requirement during the sleep cycles, wherein the wireless communications device is adapted to enable a receiving function during the wakeup cycles and to disable the receiving function during the sleep cycles, and wherein the wireless communications device is adapted to disable a transmitting function during the idle mode and to enable the transmitting function when not in the idle mode;
 transitioning from a sleep cycle in the idle mode to a wakeup cycle in the idle mode;
 determining whether a predetermined off-frequency searching condition is satisfied during the wakeup cycle, the off-frequency searching condition being satisfied when a maximum signal-to-noise ratio for one or more base stations in an active set of the wireless mobile communications device is less than a prescribed level and there are no on-frequency base stations included in a candidate set of the wireless mobile communications device;
 performing off-frequency pilot signal searching during the off-frequency searching time period in the wakeup cycle upon at least one other frequency for at least one neighboring base station not in the active set for the wireless communications device when the off-frequency searching condition is satisfied;
 performing on-frequency pilot signal searching during the on-frequency searching time period in the wakeup cycle upon at least one frequency for at least one base station in the active set for the wireless communications device when the off-frequency searching condition is satisfied or not satisfied; and
 transitioning from the wakeup cycle to the sleep cycle if additional communication is not required.

23. The circuitry of claim 22, the operations further comprising:

performing off-frequency pilot signal searching during the off-frequency searching time period in the wakeup cycle upon the at least one other frequency for the at least one neighboring base station not in the active set for the wireless communications device when the off-frequency searching condition is satisfied, wherein the performing the on-frequency pilot signal searching occurs before or after the performing of the off-frequency pilot signal searching when the off-frequency searching condition is satisfied.

24. The circuitry of claim 22, where the operation of determining whether the predetermined off-frequency searching condition is satisfied comprises determining whether a count of base stations in the active set is less than a prescribed number.

25. The circuitry of claim 22, where the operation of determining whether the predetermined off-frequency searching condition is satisfied comprises determining whether a count of base stations included in a candidate set of the device and utilizing the at least one frequency does not exceed a prescribed number.

26. The circuitry of claim 22, where the operation of determining whether the predetermined off-frequency searching condition is satisfied comprises determining whether candidate and non-candidate neighbor sets of the device collectively include at least a prescribed number of base stations utilizing frequency different than the at least one frequency.

27. The circuitry of claim 22, where the operation of determining whether a predetermined off-frequency searching condition is satisfied comprises determining whether
a count of base stations in the active set is less than a prescribed number;
a maximum signal-to-noise ratio for the at least one base station in the active set is less than a prescribed level;
a count of base stations included in a candidate set of the device and utilizing the at least one frequency is not exceeding a prescribed number; or
candidate and non-candidate neighbor sets of the device collectively include at least a prescribed number of base stations utilizing frequency different than the at least one frequency.

28. A wireless mobile telephone, comprising:
a transceiver;
a speaker;
a microphone;
a user interface;
a manager, coupled to the transceiver, speaker, microphone, and user interface, and programmed for:
operating in an idle mode including wakeup cycles and sleep cycles, wherein each of the wakeup cycles includes an on-frequency searching time period and an off-frequency searching time period, wherein the wireless mobile telephone has a first power requirement during the wakeup cycles and has a second power requirement less than the first power requirement during the sleep cycles, wherein the wireless mobile telephone is adapted to enable a receiving function during the wakeup cycles and to disable the receiving function during the sleep cycles, and wherein the wireless mobile telephone is adapted to disable a transmitting function during the idle mode and to enable the transmitting function when not in the idle mode;
transitioning from a sleep cycle in the idle mode to a wakeup cycle in the idle mode;
determining whether an off-frequency searching condition is satisfied during the wakeup cycle, the off-frequency searching condition being satisfied when a maximum signal-to-noise ratio for one or more base stations in an active set of the wireless mobile telephone is less than a prescribed level and there are no on-frequency base stations included in a candidate set of the wireless mobile telephone;
performing off-frequency pilot signal searching during the off-frequency searching time period in the wakeup cycle upon at least one other frequency for at least one neighboring base station not in the active set for the wireless mobile telephone when the off frequency searching condition is satisfied;
performing on-frequency pilot signal searching during the on-frequency searching time period in the wakeup cycle upon at least one frequency for at least one base station in the active set for the wireless mobile telephone when the off-frequency searching condition is satisfied or not satisfied, wherein the performing the on-frequency pilot signal searching occurs before or after the performing of the off-frequency pilot signal searching when the off-frequency searching condition is satisfied; and
transitioning from the wakeup cycle to the sleep cycle if additional communication is not required.

29. A wireless communications device, comprising:
a transceiver;
a speaker;
a microphone;
a user interface; and
a manager, coupled to the transceiver, speaker, microphone, and user interface, comprising:
means for operating in an idle mode including wakeup cycles and sleep cycles, wherein each of the wakeup cycles includes an on-frequency searching time period and an off-frequency searching time period, wherein the wireless communications device has a first power requirement during the wakeup cycles and has a second power requirement less than the first power requirement during the sleep cycles, wherein the wireless communications device is adapted to enable a receiving function during the wakeup cycles and to disable the receiving function during the sleep cycles, and wherein the wireless communications device is adapted to disable a transmitting function during the idle mode and to enable the transmitting function when not in the idle mode;
means for transitioning from a sleep cycle in the idle mode to a wakeup cycle in the idle mode;
means for determining whether an off-frequency searching condition is satisfied during the wakeup cycle, the off-frequency searching condition being satisfied when a maximum signal-to-noise ratio for one or more base stations in an active set of the wireless communications device is less than a prescribed level and there are no on-frequency base stations included in a candidate set of the wireless communications device;
means for performing off-frequency pilot signal searching during the off-frequency searching time period in the wakeup cycle upon at least one other frequency for at least one neighboring base station not in the active set for the wireless communications device when the off-frequency searching condition is satisfied;
means for performing on-frequency pilot signal searching during the on-frequency searching time period in the wakeup cycle upon at least one frequency for at least one base station in the active set for the wireless communications device when the off-frequency searching condition is satisfied or not satisfied; and
means for transitioning from the wakeup cycle to the sleep cycle if additional communication is not required.

30. A wireless mobile telephone, comprising:
transceiver means for wireless transmitting and receiving signals;
speaker means for producing audio output;
microphone means for a microphone;
user interface means for receiving user input and providing human-readable output; and
manager means, coupled to the transceiver means, speaker means, microphone means, and user interface means, comprising:
means for operating in an idle mode including wakeup cycles and sleep cycles, wherein each of the wakeup cycles includes an on-frequency searching time period and an off-frequency searching time period, wherein the wireless mobile telephone has a first power requirement during the wakeup cycles and has a second power requirement less than the first power requirement during the sleep cycles, wherein the wireless mobile telephone is adapted to enable a receiving function during the wakeup cycles and to disable the receiving function during the sleep cycles, and wherein the wireless mobile telephone is adapted to disable a transmitting function during the idle mode and to enable the transmitting function when not in the idle mode;
means for transitioning from a sleep cycle in the idle mode to a wakeup cycle in the idle mode;
means for determining whether an off-frequency searching condition is satisfied during the wakeup cycle, the off-frequency searching condition being satisfied when a maximum signal-to-noise ratio for one or more base stations in an active set of the wireless mobile telephone is less than a prescribed level and there are no on-frequency base stations included in a candidate set of the wireless mobile telephone;
means for performing off-frequency pilot signal searching during the off-frequency searching time period in the wakeup cycle upon at least one other frequency for at least one neighboring base station not in the active set for the wireless mobile telephone when the off-frequency searching condition is satisfied;
means for performing on-frequency pilot signal searching during the on-frequency searching time period in the wakeup cycle upon at least one frequency for at least one base station in the active set for the wireless mobile telephone when the off-frequency searching condition is satisfied or not satisfied, wherein the performing the on-frequency pilot signal searching occurs before or after the performing of the off-frequency pilot signal searching when the off-frequency searching condition is satisfied; and
means for transitioning from the wakeup cycle to the sleep cycle if additional communication is not required.

31. A wireless communications device, comprising:
transceiver means for wireless transmitting and receiving signals;
speaker means for producing audio output;
microphone means for a microphone;
user interface means for receiving user input and providing human-readable output;
manager means, coupled to the transceiver means, speaker means, microphone means, and user interface means, for performing operations comprising:
operating in an idle mode including wakeup cycles and sleep cycles, wherein each of the wakeup cycles includes an on-frequency searching time period and an off-frequency searching time period, wherein the wireless communications device has a first power requirement during the wakeup cycles and has a second power requirement less than the first power requirement during the sleep cycles, wherein the wireless communications device is adapted to enable a receiving function during the wakeup cycles and to disable the receiving function during the sleep cycles, and wherein the wireless communications device is adapted to disable a transmitting function during the idle mode and to enable the transmitting function when not in the idle mode;
transitioning from a sleep cycle in the idle mode to a wakeup cycle in the idle mode;
determining whether a predetermined off-frequency searching condition is satisfied during the wakeup cycle, the off-frequency searching condition being satisfied when a maximum signal-to-noise ratio for one or more base stations in an active set of the wireless communications device is less than a prescribed level and there are no on-frequency base stations included in a candidate set of the wireless communications device;
performing off-frequency pilot signal searching during the off-frequency searching time period in the wakeup cycle upon at least one other frequency for at least one neighboring base station not in the active set for the wireless communications device when the off-frequency searching condition is satisfied;
performing on-frequency pilot signal searching during the on-frequency searching time period in the wakeup cycle upon at least one frequency for at least one base station in the active set for the wireless communications device when the off-frequency searching condition is satisfied or not satisfied; and
transitioning from the wakeup cycle to the sleep cycle if additional communication is not required.

32. The method of claim 1, wherein the off-frequency searching condition is determined based on results of the on-frequency pilot signal searching.

33. The method of claim 1, wherein the off-frequency searching condition is selected to avoid off-frequency pilot signal searching when likelihood of requiring off-frequency handoff is low.

* * * * *

UNITED STATES PATENT AND TRADEMARK OFFICE
CERTIFICATE OF CORRECTION

PATENT NO. : 7,623,861 B2 Page 1 of 1
APPLICATION NO. : 10/313750
DATED : November 24, 2009
INVENTOR(S) : Joshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this

Fourteenth Day of December, 2010

David J. Kappos
*Director of the United States Patent and Trademark Office*